US010034006B2

(12) United States Patent
Sole et al.

(10) Patent No.: US 10,034,006 B2
(45) Date of Patent: *Jul. 24, 2018

(54) METHODS AND APPARATUS FOR VIDEO ENCODING AND DECODING BINARY SETS USING ADAPTIVE TREE SELECTION

(71) Applicant: THOMSON LICENSING, Issy de Moulineaux (FR)

(72) Inventors: Joel Sole, La Jolla, CA (US); Peng Yin, Ithaca, NY (US); Yunfei Zheng, San Jose, CA (US); Xiaoan Lu, Yardley, PA (US); Qian Xu, Folsom, CA (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 15 days.

This patent is subject to a terminal disclaimer.

(21) Appl. No.: 15/190,827

(22) Filed: Jun. 23, 2016

(65) Prior Publication Data

US 2016/0309191 A1 Oct. 20, 2016

Related U.S. Application Data

(63) Continuation of application No. 13/439,006, filed on Apr. 4, 2012, now Pat. No. 9,661,336, which is a (Continued)

(51) Int. Cl.
*H04N 11/02* (2006.01)
*H04N 19/184* (2014.01)
(Continued)

(52) U.S. Cl.
CPC ......... *H04N 19/184* (2014.11); *H04N 19/117* (2014.11); *H04N 19/124* (2014.11); (Continued)

(58) Field of Classification Search
None
See application file for complete search history.

(56) References Cited

U.S. PATENT DOCUMENTS 5,412,741 A * 5/1995 Shapiro .................. H03M 7/30
358/1.9
6,298,163 B1 * 10/2001 Sodagar ............... H04N 19/647
375/E7.071
(Continued)

FOREIGN PATENT DOCUMENTS

JP 2008530829 8/2008
WO WO9836632 8/1998

OTHER PUBLICATIONS

Swanson et al., "A Binary Wavelet Decomposition of Binary Images", IEEE Transactions on Image Processing, vol. 5, No. 12, Dec. 1996.*
Bayazit, "Significance Map Pruning and Other Enhancements to SPIHT Image Coding Algorithm", Signal Processing, Image Communication, vol. 18, No. 9, Oct. 1, 2003, pp. 769-785.
Davis et al., "Image Coding Using Optimized Signifcance Tree Quantization", Data Compression Conference, 1997, DCD '08. Snowbird, UT, Mar. 25-27, 1997, pp. 387-396.
(Continued)

*Primary Examiner* — Dakshesh D Parikh
(74) *Attorney, Agent, or Firm* — Brian J. Borini; Ronald J. Kolczynski

(57) ABSTRACT

Methods and apparatus are provided for encoding and decoding binary sets using adaptive tree selection. In one exemplary encoding method embodiment, picture data is encoded for a block in a picture; in which one of a plurality of trees structures is selected to code a binary set of data for indicating coefficient significance for the block. In another exemplary encoding method embodiment, picture data is encoded for a block in a picture, in which one or more trees are used to encode a binary set of data for indicating coefficient significance for the block, the one or more trees each having a plurality of nodes, at least one of the nodes of the one or more trees being modified responsive to at least one parameter.

11 Claims, 9 Drawing Sheets

Related U.S. Application Data continuation of application No. 13/381,149, filed as application No. PCT/US2010/001809 on Jun. 23, 2010, now Pat. No. 9,621,925.

(60) Provisional application No. 61/222,729, filed on Jul. 2, 2009.

(51) Int. Cl.

| | | |
|---|---|---|
| *H04N 19/159* | (2014.01) | |
| *H04N 19/70* | (2014.01) | |
| *H04N 19/147* | (2014.01) | |
| *H04N 19/172* | (2014.01) | |
| *H04N 19/46* | (2014.01) | |
| *H04N 19/64* | (2014.01) | |
| *H04N 19/61* | (2014.01) | |
| *H04N 19/91* | (2014.01) | |
| *H04N 19/117* | (2014.01) | |
| *H04N 19/124* | (2014.01) | |
| *H04N 19/139* | (2014.01) | |
| *H04N 19/176* | (2014.01) | |
| *H04N 19/625* | (2014.01) | |

(52) U.S. Cl.
CPC ......... *H04N 19/139* (2014.11); *H04N 19/147* (2014.11); *H04N 19/159* (2014.11); *H04N 19/172* (2014.11); *H04N 19/176* (2014.11); *H04N 19/46* (2014.11); *H04N 19/61* (2014.11); *H04N 19/625* (2014.11); *H04N 19/647* (2014.11); *H04N 19/70* (2014.11); *H04N 19/91* (2014.11)

(56) References Cited

U.S. PATENT DOCUMENTS

| | | | |
|---|---|---|---|
| 7,561,078 B2* | 7/2009 | Hwang | H04N 19/176 |
| | | | 341/50 |
| 2002/0006164 A1 | 1/2002 | Felts | |
| 2006/0133680 A1 | 6/2006 | Bossen | |
| 2009/0304291 A1 | 12/2009 | Boulton | |

OTHER PUBLICATIONS

Davis et al., "Embedded Image Coding Using Optimized Significance Tree Quantization", Signals, Systems and Computers, 1997, Conference Recrd of the Thirty-First Asilomar Conference, Pacific Grove, CA, Nov. 2-5, 1997, pp. 362-366.

Marpe et al., "Design of Highly Efficient Wavelet-Based Video Coding Scheme", Visual Communications and Image Processing 2002, vol. 4671, San Jose, CA, Jan. 21, 2002.

Moinuddin et al., "Significance of Tree Structures for Zerotree-Based Wavelet Video Codecs", Multimedia, Signal Processing and Communication Technologies, 2009, Impact '09, Mar. 14, 2009, pp. 233-236.

International Telecommunication Union, "Advanced Video Coding for Generic Audiovisual Services", ITU-T H.264, Mar. 2005, 343 pages.

Said et al., "A New, Fast, and Efficient Image Codec Based on Set Partitioning in Hierarchical Trees", IEEE Transactions on Circuits and Systems for Video Technology, vol. 6, No. 3, Jun. 1996.

Said et al., "An Image Multiresolution Representation for Lossless and Lossy Compression", SPIE Symposium on Visual Communications and Image Processing, Cambridge, MA, Nov. 1993.

Swanson et al:"A Binary Wavelet Decomposition of Binary Images", IEEE Transactions on Image Processing, vol. 5, No. 12, Dec. 1996.

International Search Report dated Dec. 7, 2010.

Swanson, M. D., et al., Wavelet Decomposition of Binary Finite Images, Proceedings of the International Conference on Image Processing (ICIP), Austin, TX, USA, Nov. 13-16, 1994, vol. 1, Nov. 13, 1994, pp. 61-65, IEEE Comp. Soc. Press, Los Alamitos, US.

Alkholdi, et al., "A New Approach for Optical Colored Image Compression Using the JPEG Standards", Signal Processing, Nov. 18, 2006, pp. 573-576, paragraph 3, vol. 87, No. 4, Elsevier Science Publishers, B.V. Amsterdam, NL.

Fowler, J E., "Embedded Wavelet-Based Image Compression: State of the Art//Eingebettete Wavelet-Basierte-Bildkompression: Stand Der Technik", IT—Information Technology, Oldenbourg Wissenschaftsverlag, Munchen, DE LNKD-DOI: 10.1524/ITIT.45.5. 256.22708, Oct. 1, 2003, pp. 258-260, paragraph 4-paragraph 4.3, vol. 45, No. 5.

* cited by examiner

METHODS AND APPARATUS FOR VIDEO ENCODING AND DECODING BINARY SETS USING ADAPTIVE TREE SELECTION

CROSS-REFERENCE TO RELATED APPLICATIONS

This application is continuation of co-pending U.S. patent application Ser. No. 13/439,006 filed on Apr. 4, 2012; which is a continuation application of U.S. Non-Provisional patent application Ser. No. 13/381,149, filed Dec. 28, 2011; which is a national stage entry of PCT/US10/01809, filed on Jun. 23, 2010, which itself claims the benefit of U.S. Provisional Application Ser. No. 61/222,729, filed Jul. 2, 2009, each of which is incorporated by reference herein in their respective entireties.

TECHNICAL FIELD

The present principles relate generally to video encoding and decoding and, more particularly, to methods and apparatus for video encoding and decoding binary sets using adaptive tree selection.

BACKGROUND

The block-based discrete transform is a fundamental component of many image and video compression standards including, for example, the Joint Photographic Experts Group, the International Telecommunication Union, Telecommunication Sector (ITU-T) H.263 Recommendation (hereinafter the "H.263 Recommendation"), the International Organization for Standardization/International Electrotechnical Commission (ISO/IEC) Moving Picture Experts Group-1 (MPEG-1) Standard, the ISO/IEC MPEG-2 Standard, the ISO/IEC MPEG-4 Part 10 Advanced Video Coding (AVC) Standard/ITU-T H.264 Recommendation (hereinafter the "MPEG-4 AVC Standard"), as well as others, and is used in a wide range of applications. Most modern video coding standards employ transforms to efficiently reduce the correlation of the residue in the spatial domain. The discrete cosine transform (DCT) is the most extensively used block transform.

After the transform process, the transform coefficients are quantized. Then, the quantized coefficients are entropy encoded to convey the information of their level and sign. The percentage of zeroed coefficients is very high, so the encoding process is efficient when divided into two steps. In a first step, the locations of the non-zero coefficients are signaled. In a second step, the level and sign of these coefficients are signaled.

An efficient way to encode the locations involves using tree structures. Nevertheless, sending the location of the coefficients can still be quite expensive, because the video content data has varying statistics and properties, and the transform coefficients significance also has different properties depending on the position of the coefficient. However, conventional tree-based encoding of the significance does not properly take into account these varying statistics and properties across the coefficients and the content.

SUMMARY

These and other drawbacks and disadvantages of the prior art are addressed by the present principles, which are directed to methods and apparatus for video encoding and decoding using adaptive tree selection.

According to an aspect of the present principles, there is provided an apparatus. The apparatus includes a video encoder for encoding picture data for at least a block in a picture. The video encoder selects from among a plurality of trees to code a binary set of data for indicating coefficient significance for at least the block.

According to another aspect of the present principles, there is provided a method in a video encoder. The method includes encoding picture data for at least a block in a picture. The encoding step includes selecting from among a plurality of trees to code a binary set of data for indicating coefficient significance for at least the block.

According to yet another aspect of the present principles, there is provided an apparatus. The apparatus includes a video decoder for decoding picture data for at least a block in a picture. The video decoder selects from among a plurality of trees to code a binary set of data for indicating coefficient significance for at least the block.

According to still another aspect of the present principles, there is provided a method in a video decoder. The method includes decoding picture data for at least a block in a picture. The decoding step includes selecting from among a plurality of trees to code a binary set of data for indicating coefficient significance for at least the block.

According to a further aspect of the present principles, there is provided an apparatus. The apparatus includes a video encoder for encoding picture data for at least a block in a picture. One or more trees are used to encode a binary set of data for indicating coefficient significance for at least the block. The one or more trees each have a plurality of nodes. At least one of the nodes of at least one of the one or more trees is modified responsive to one or more parameters.

According to a still further aspect of the present principles, there is provided a method in a video encoder. The method includes encoding picture data for at least a block in a picture. One or more trees are used to encode a binary set of data for indicating coefficient significance for at least the block. The one or more trees each have a plurality of nodes. At least one of the nodes of at least one of the one or more trees is modified responsive to one or more parameters.

According to a yet further aspect of the present principles, there is provided an apparatus. The apparatus includes a video decoder for decoding picture data for at least a block in a picture. One or more trees are used to decode a binary set of data for indicating coefficient significance for at least the block. The one or more trees each have a plurality of nodes. At least one of the nodes of at least one of the one or more trees being is responsive to one or more parameters.

According to an additional aspect of the present principles, there is provided a method in a video decoder. The method includes decoding picture data for at least a block in a picture. One or more trees are used to decode a binary set of data for indicating coefficient significance for at least the block. The one or more trees each have a plurality of nodes. At least one of the nodes of at least one of the one or more trees is modified responsive to one or more parameters.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
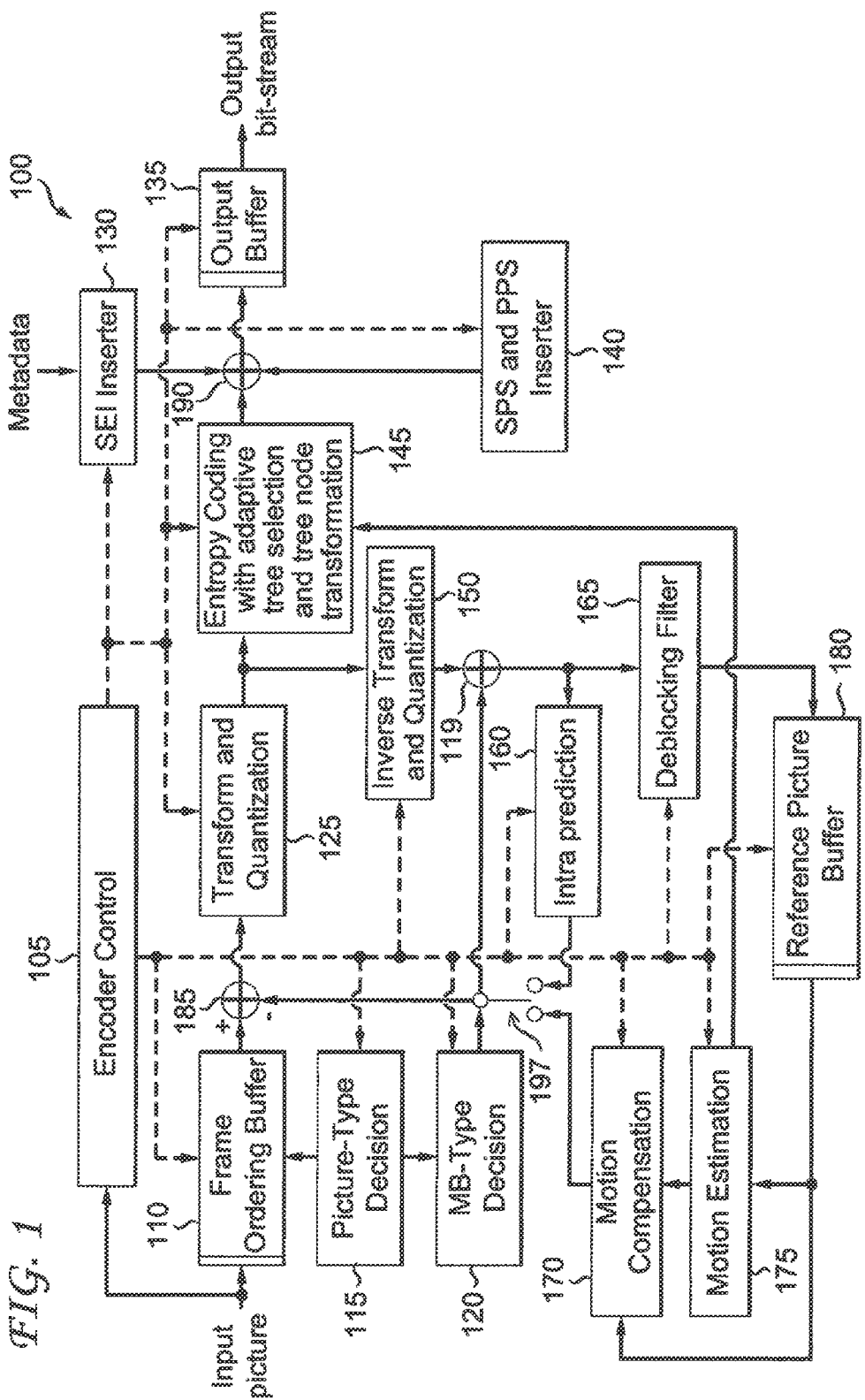
FIG. 1 is a block diagram showing an exemplary video encoder to which the present principles may be applied, in accordance with an embodiment of the present principles.

The present principles are directed to methods and apparatus for video encoding and decoding binary sets using adaptive tree selection.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the word "signal" refers to indicating something to a corresponding decoder. For example, the encoder may signal one or more trees or sub-trees for use in decoding data such as, for example a binary set of data for indicating coefficient significance for one or more blocks in a picture and/or may signal one or more parameters for use in determining a modification to one or more nodes of one or more trees and/or sub-trees. In this way, the same trees, sub-trees, and/or modifications may be used at both the encoder side and the decoder side. Thus, for example, an encoder may transmit a set of trees and/or sub-trees to the decoder so that the decoder may use the same set of trees and/or sub-trees or, if the decoder already has the trees and/or sub-trees as well as others, then signaling may be used (without transmitting) to simply allow the decoder to know and select the trees and/or sub-trees. By avoiding transmission of any actual trees and/or sub-trees and/or parameters (used to node modifications), a bit savings may be realized. It is to be appreciated that signaling may be accomplished in a variety of ways. For example, one or more syntax elements, flags, and so forth may be used to signal information to a corresponding decoder.

Turning to FIG. 1, an exemplary video encoder to which the present principles may be applied is indicated generally by the reference numeral 100.

The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder with adaptive tree selection and tree node transformation 145 and a first input of an inverse transformer and inverse quantizer 150. An output of the entropy coder with adaptive tree selection and tree node transformation 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, a first input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder with adaptive tree selection and tree node transformation 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of the frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175 and a third input of the motion compensator 170. A first output of the motion estimator 175 is connected in signal communication with a second input of the motion compensator 170. A second output of the motion estimator 175 is connected in signal communication with a third input of the entropy coder with adaptive tree selection and tree node transformation 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and an inverting input of the combiner 185.

A first input of the frame ordering buffer 110 and an input of the encoder controller 105 are available as inputs of the encoder 100, for receiving an input picture. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

Figure 2:
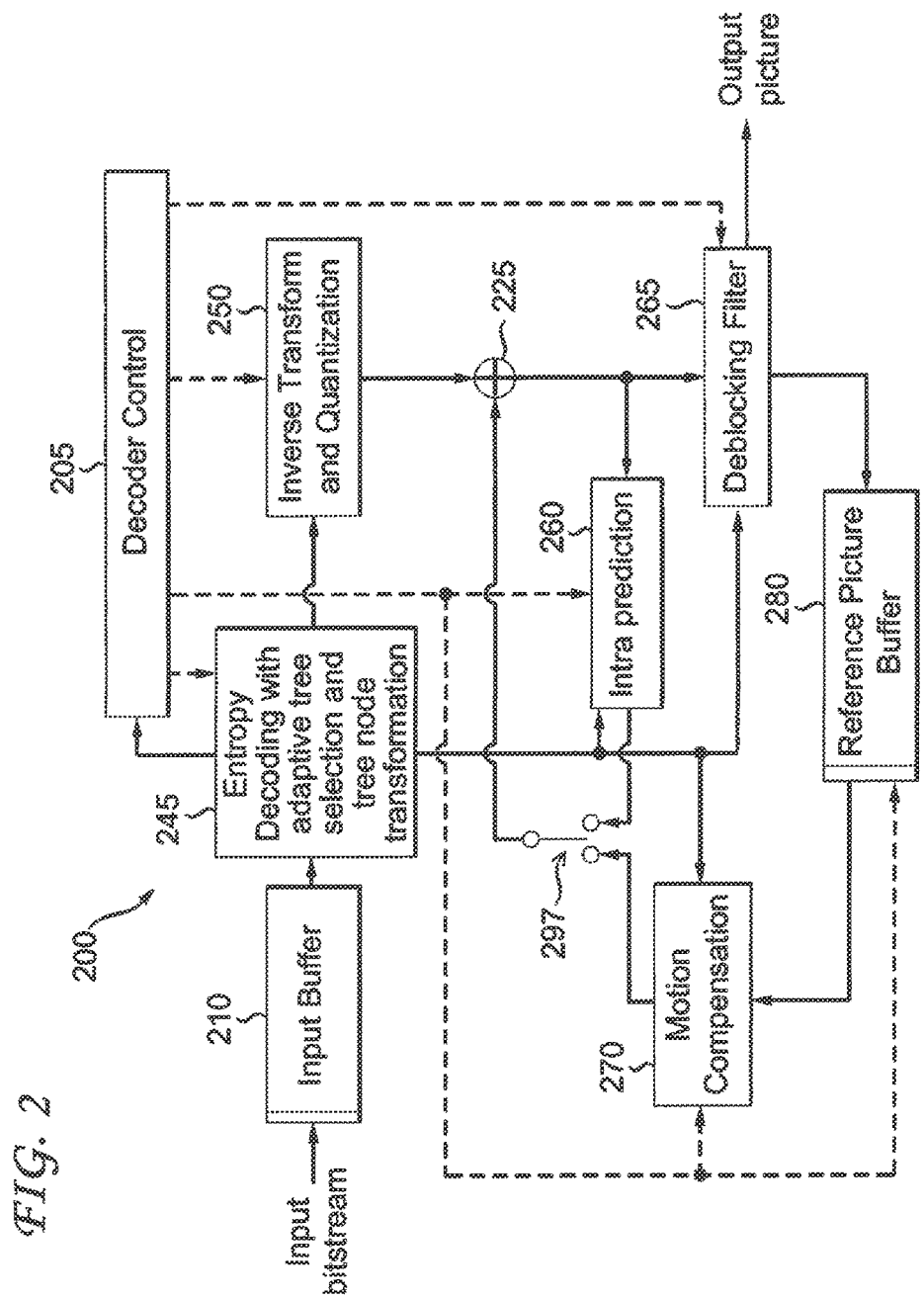
FIG. 2 is a block diagram showing an exemplary video decoder to which the present principles may be applied, in accordance with an embodiment of the present principles.

Turning to FIG. 2, an exemplary video decoder to which the present principles may be applied is indicated generally by the reference numeral 200.

The video decoder 200 includes an input buffer 210 having an output connected in signal communication with a first input of an entropy decoder with adaptive tree selection and tree node transformation 245. A first output of the entropy decoder with adaptive tree selection and tree node transformation 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with a first input of a reference picture buffer 280. An output of the reference picture buffer 280 is connected in signal communication with a second input of a motion compensator 270.

A second output of the entropy decoder with adaptive tree selection and tree node transformation 245 is connected in signal communication with a third input of the motion compensator 270, a first input of the deblocking filter 265, and a third input of the intra predictor 260. A third output of the entropy decoder with adaptive tree selection and tree node transformation 245 is connected in signal communication with an input of a decoder controller 205. A first output of the decoder controller 205 is connected in signal communication with a second input of the entropy decoder with adaptive tree selection and tree node transformation 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, a first input of the motion compensator 270, and a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

As noted above, the present principles are directed to methods and apparatus for encoding and decoding using adaptive tree selection. Such adaptive tree selection may be used to code or decode, for example, binary sets of data for indicating coefficient significance for one or more blocks in a picture.

In the MPEG-4 AVC Standard, non-zero coefficient locations are encoded by means of a significance map. The significance map in the MPEG-4 AVC Standard works as follows. If the coded_block_flag indicates that a block has significant coefficients, then a binary-valued significance map is encoded. For each coefficient in scanning order, a one-bit symbol significant_coeff_flag is transmitted. If the significant_coeff_flag symbol is one, i.e., if a nonzero coefficient exists at this scanning position, then a further one-bit symbol last_significant_coeff_flag is sent. This symbol indicates if the current significant coefficient is the last one inside the block or if further significant coefficients follow. Note that the flags (significant_coeff_flag, last_significant_coeff_flag) for the last scanning position of a block are never transmitted. If the last scanning position is reached and the significance map encoding was not already terminated by a last_significant_coeff_flag with a value of one, then it is obvious that the last coefficient has to be significant.

Figure 3:
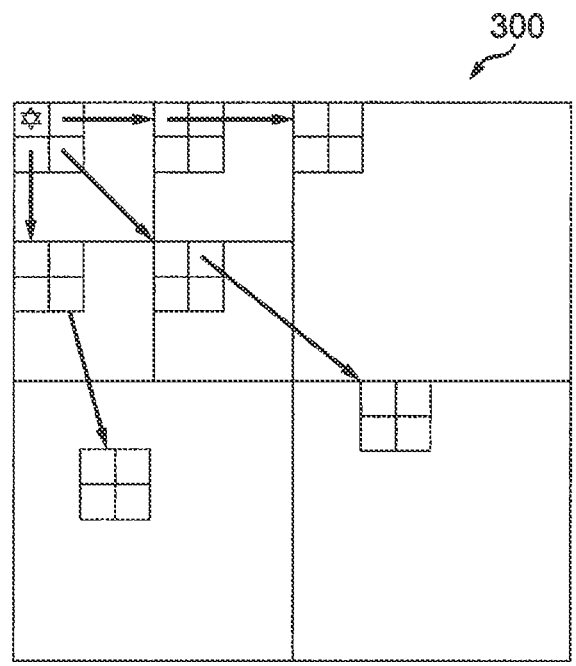
FIG. 3 is a diagram showing an exemplary tree-structure to which the present principles may be applied, in accordance with an embodiment of the present principles.

Another way to indicate the significance involves "zero-trees". Examples can be found in the wavelet transform for image compression. A tree-structure is used to convey the significance map. Turning to FIG. 3, an exemplary tree-structure to which the present principles may be applied is indicated generally by the reference numeral 300. Each of the small squares means a transform coefficient. The root of the tree is represented by the square with the star included therein. The child-nodes are the neighboring coefficients. After that, the child-node relations are signaled with an arrow. As shown, each parent has as children, four other coefficients. The tree-structure 300 is only an example that shows these relationships and how the tree is structured, but does not show the entire tree or parent-child relationships within the tree. In this case, each node of the tree is related to a coefficient, and the tree is constructed taking into account the spatial relationships between the wavelet transform coefficients in 2-D. Then, for every node, a 0 or a 1 is sent. A value/symbol of 0 means that the coefficient at a particular node in the tree as well as all the coefficients below that coefficient in the tree are zero. In this way, many zero coefficients are encoded with only one symbol. When there are many zeros, this attains a good compression ratio. It is to be recognized that, for purposes of this disclosure and application, the use of the word "tree" is equivalent to the word "tree structure" and "sub-tree" is equivalent to the word "sub-tree structure".

Figure 4:
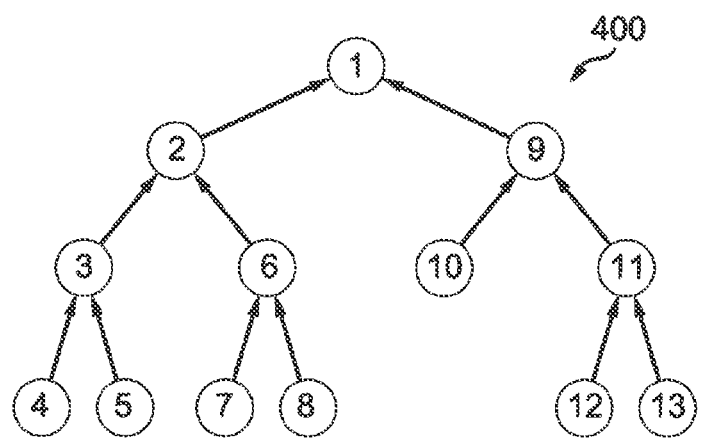
FIG. 4 is a diagram showing an exemplary binary tree to which the present principles may be applied, in accordance with an embodiment of the present principles.

Many algorithms followed the concept of the so-called zero trees. A variant is the so-called binary-tree coding, which is a simple yet efficient type of tree. In this case, each leaf of the tree can be related to a transform coefficient, while the internal nodes of the tree are not related to any coefficient. Then, the encoding is similar than in the previous case, i.e., when all the coefficients below a node are zero, then a 0 can indicate that situation, so there is no need to go below that node and explicitly indicate the significance/zero value of each coefficient. Turning to FIG. 4, an exemplary binary tree to which the present principles may be applied is indicated generally by the reference numeral 400. The binary tree 400 includes nodes 1 through 13. Node 1 is the root node. Nodes 2, 3, 6, 9 and 11 are internal nodes. Nodes 4, 5, 7, 8, 10, 12, and 13 are leaf nodes.

The probability of being significant depends on many factors that these methods do not take into account properly. There is a spatial correlation between the significance of coefficients. Also, the statistical properties of the lower frequencies coefficients are different from the statistical properties of the higher frequencies coefficients. Also, the significance map of different residue blocks can be very different. Therefore, using a single data-structure and encoding process is not enough to capture all this variability.

Accordingly, in consideration of at least the above-described deficiencies of the prior art, in at least one embodiment of the present principles, we propose the use of several trees and sub-trees to better adapt to the variability of the significance map. Having several available trees and sub-trees at the same time and selecting from these trees to encode a given binary set can enhance coding efficiency. For instance, in an embodiment, the final bit rate to encode each of the sub-trees is an adequate metric to base the selection on. In an embodiment, for each significance map, we propose a selection of the best tree or combination of sub-trees to encode it. In addition, in an embodiment, we propose the use of transforms, grouping, flipping signs and other operations that exploit the statistical properties and correlation among the values of the leaves. In an embodiment, we propose the use of these operations in the trees, sub-trees or parts of them. Also, in an embodiment, to further exploit the potential inter-dependencies of the binary set, we propose to do a pre-processing of the leaves through binary operators.

We further propose to employ a set of sub-trees and adaptively select among them to improve the efficiency in the encoding of the locations of the zero/non-zero coefficients. Also, we propose performing operations/transforms on the nodes/leaves of the trees, thus changing their initial meaning, in order to better exploit their inter-dependencies.

In the zero tree structure for encoding binary sets (like the significance map of the transformed coefficients), the leaves are given the binary value of an element in the set. Therefore, there is a one-to-one relation between the value of each leaf and each element in the binary set. The significance map of the residue coefficients forms a binary set.

The value of each internal node is found by determining the value of the nodes below it. In this way, the significance/binary value of each internal node is derived from the leaves (nodes) to the root node. Then, the tree is encoded by signaling the value of the nodes starting from the root node. Compression is attained because when a "0" is marked for a node that means that all the nodes below it are "0", so there is no need to specifically signal their value.

The probability of being significant depends on many factors that the prior art methods do not properly take into account. There is a spatial correlation between the significance of coefficients. Also, the statistical properties of the lower frequencies coefficients are different from the statistical properties of the higher frequencies coefficients. Also, the significance map of different residue blocks can be very different. Therefore, using a single data-structure and encoding process is not enough to capture all this variability.

In an embodiment, we propose to select among several trees and sub-trees to encode a given binary set like the significance map. Also, we propose the potential change of the meaning of the tree-leaves values in some leaves via a transform, flipping bit, or other operators. The goal of this change is have a more compact representation of "0" and "1" than the original values within the tree, so that the tree encoding process is more efficient.

Hereinafter, we describe several embodiments. Of course, given the teachings of the present principles provided herein, one of ordinary skill in this and related arts will contemplate these and other variations of the present principles, while maintaining the spirit and scope of the present principles.

In one embodiment, the cost of encoding the set with each tree is computed and the tree with the least cost is used to encode the significance map. The cost function can be the final bit rate, the entropy, and/or one or more other parameters. The selected tree can be signaled, for example, with a flag.

In one embodiment, there are several trees at our disposal, and the chosen one depends on the prediction mode, or the particular transform used for the block, and/or other decoded data, so that there is no need for the encoder to explicitly signal the right (i.e., the selected) tree to use.

In one embodiment, the significance map is split in several parts. For each part, a set of sub-trees can be used to encode a particular part. The cost of each sub-tree is computed and the one with the least cost is selected for the encoding of that part of the significance map. At each part, a flag can indicate the selected sub-tree. Also, when a sub-tree has been encoded, it has to be indicated whether the rest of the map is being encoded (i.e., there are remaining significance coefficients) or not (i.e., all the remaining coefficients are zero). To that end, in one embodiment a flag can indicate the significance of the rest of the map. In another embodiment, this is indicated with an additional node in the sub-tree. This node is "0" when the rest of the map is zero and is "1" when the rest of the map has at least one significant coefficient. This node/leaf is encoded along with the rest of the tree, so no explicit signaling is necessary. In this embodiment, the sub-trees may have an additional node to that end (i.e., for that purpose). As an exception, the sub-trees devoted to encode the last part of the map do not need this additional node. Also, some sub-trees to encode an intermediate part of the tree may not have this node, and when they are selected it implicitly means that the rest of the map is zero.

In one embodiment, a set of trees and sub-trees can be used to encode the significance map. The sub-trees can have different sizes. The cost of the different combinations of sub-trees and the cost of the full trees is computed and the combination or tree with the least cost is selected to encode the binary set.

In at least one embodiment, a second part to our approach to encoding/decoding using adaptive tree selection involves how to combine/modify/transform the nodes or a subset of nodes in a tree in order to further exploit the correlation and dependencies among them. Since the encoding of the tree is more efficient when the part of the binary set that is zero is larger (than the non-zero part), then any processing that leads to a larger amount of zeros helps the encoding process. For instance, in the case of the significance map, it is much less probable that a coefficient is significant when the neighbors are zero than when the neighbors of the coefficient are non-zero. The particular structure of the tree can partially account for that fact, but it cannot fully capture and exploit all the dependencies. The series of combinations and operations on the leaves that we propose aim at solving this problem.

In the significance map case, the nodes of the tree are linked to neighboring coefficients in two dimensions (2-D). This is because the 2-D significance map is scanned in one dimension (1-D) and then mapped to the tree nodes. The 2-D block residue shows dependencies among neighboring coefficients, so the corresponding tree also shows dependencies between neighboring nodes/leaves. This is why the binary processing of the nodes helps improve the efficiency.

In one embodiment, the binary processing can consider the data in the leaves of the tree as a 1-D array of data and apply a binary operator/transformation to the array.

In one particular embodiment, a binary wavelet transform, a Binary Discrete Fourier Transform and/or any other binary transform can be applied to the data. In this situation, the spatial correlation of the array is reduced and a more efficient encoding of the tree can be attained.

In another particular embodiment, the neighboring correlation can be reduced in the following way. In this situation, strings of consecutive ones and zeroes occur in the 1-D scanned significance map. The correlation is reduced by iteratively subtracting the value of a leaf from the previous leaf, starting from the second leaf in the tree. A particular embodiment of this involves applying the logical XOR operation on consecutive leaves. In this case, the following binary set 1111000001111 is transformed to the set 10001000001000. As it can be observed, this operation reduces the number of non-zeros exploiting the 1-D spatial correlation of the tree leaves.

In another particular embodiment, the meaning of the tree leaf nodes can be flipped, so the encoding of the zero-tree becomes the encoding of the significance tree. This helps when the binary tree has many more ones than zeros.

In another embodiment, a tree can have a dual meaning, i.e., some of the nodes can be processed in one way, while other nodes can be processed in other ways. This leads to a particular embodiment involving what we refer to as a dual tree. It is known that the first coefficients of the tree are usually non-zero, while the rest of the coefficients are usually zero. Then, a dual tree would flip the value of the leaves of the first coefficients, while maintaining the regular significance meaning for the rest of the leaves. Effectively, this is a dual-tree, encoding non-zeros and zeros in both parts of the tree.

Taking this proposal further, there is a point in the tree leaves in which the meaning changes (from flipping the bit value to non-flipping the bit value). This point can be changed adaptively and explicitly indicated in the bitstream or deduced from the previous reconstructed data. We call this embodiment "adaptive-flipping dual binary tree".

It is clear that the "dual" tree can be extended in several ways to pre-process the tree or one or more parts of the tree.

Also, the several "meaning change points" can be adapted and modified as necessary (i.e., not only flipping the bit, but potentially any transform/modification of the nodes is possible).

Both parts of our proposal can be combined in many ways, as readily apparent to one of ordinary skill in this and related arts, given the teachings of the present principles provided herein. For instance, some of the sub-trees can be processed, while others are not processed.

Syntax

TABLE 1 shows exemplary syntax for a sequence parameter set for adaptive tree selection for encoding binary sets, in accordance with an embodiment of the present principles. TABLE 2 shows exemplary syntax for a block parameter that indicates the particular tree employed to encode the significance map for the block, in accordance with an embodiment of the present principles.

TABLE 1

| seq_parameter_set_rbsp ( ){ | Descriptor |
|---|---|
| .... | |
| adaptive_tree_selection_flag | u(1) |
| .... | |
| } | |

TABLE 2

| residual ( ){ | Descriptor |
|---|---|
| if (adaptive_tree_selection_flag = =1) { | |
| binary_tree_index | ue(v) |
| .... | |
| } | |

The semantics of some of the syntax elements shown in TABLE 1 and TABLE 2 are as follows:

adaptive_tree_selection_flag: adaptive_tree_selection_flag equal to 0 means no adaptive tree selection is performed for encoding transformed residue coefficients (which is coded as binary set); and adaptive_tree_selection_flag equal to 1 means an adaptive tree selection is performed for encoding transformed residue coefficients.

binary_tree_index: binary_tree_index specifies the tree that is selected for encoding of the current residual block.

Figure 5:
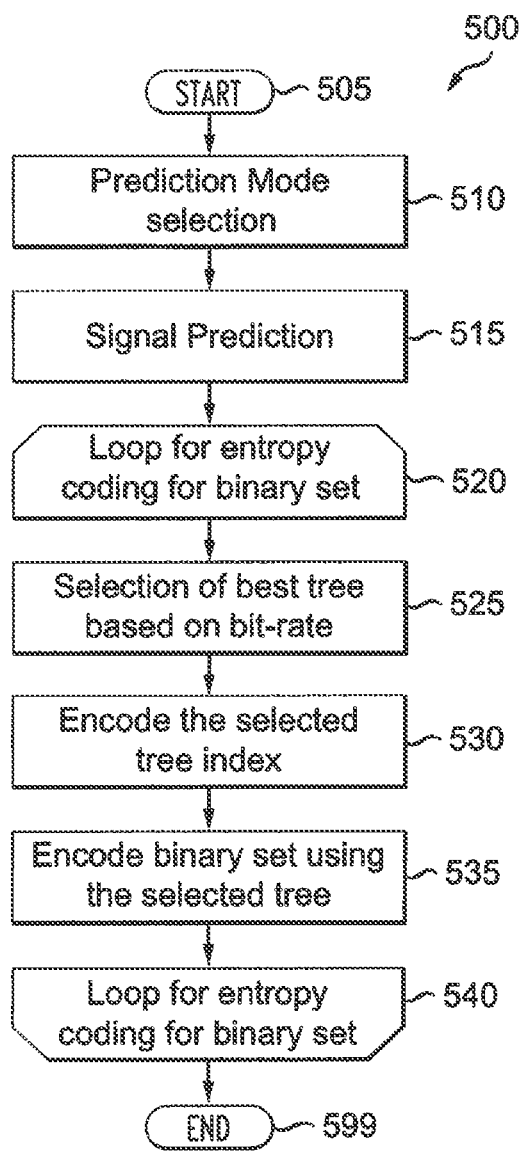
FIG. 5 is a flow diagram showing an exemplary method for encoding with adaptive tree selection, in accordance with an embodiment of the present principles.

Turning to FIG. 5, an exemplary method for encoding with adaptive tree selection is indicated generally by the reference numeral 500. The method 500 includes a start block 505 that passes control to a function block 510. The function block 510 performs a prediction mode selection, and passes control to a function block 515. The function block 515 signals a prediction (obtained from the prediction mode), and passes control to a loop limit block 520. The loop limit block 520 performs a loop for entropy coding for a binary set, and passes control to a function block 525. The function block 525 performs a best tree selection (e.g., selecting a best tree based on one or more criterion), and passes control to a function block 530. The function block 530 encodes the selected tree index, and passes control to a function block 535. The function block 535 encodes the binary set using the selected tree, and passes control to a loop limit block 540. The loop limit block 540 ends the loop, and passes control to an end block 599.

Figure 6:
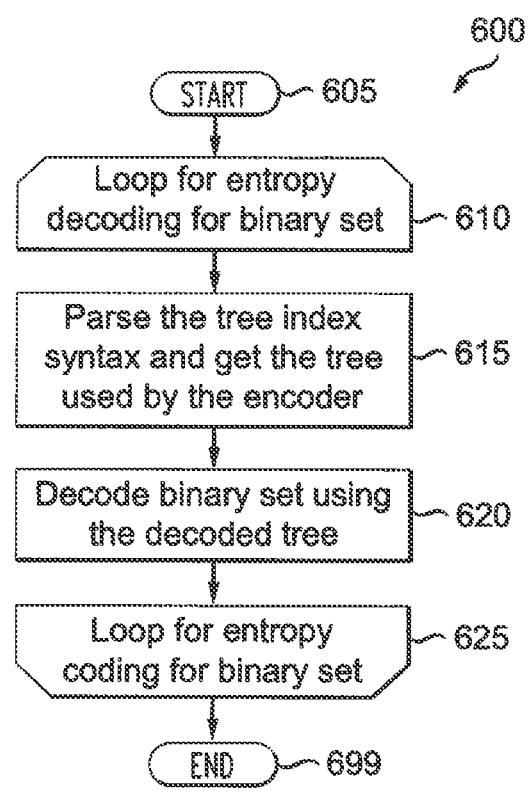
FIG. 6 is a flow diagram showing an exemplary method for decoding with adaptive tree selection, in accordance with an embodiment of the present principles.

Turning to FIG. 6, an exemplary method for decoding with adaptive tree selection is indicated generally by the reference numeral 600. The method 600 includes a start block 605 that passes control to a loop limit block 610. The loop limit block 610 performs a loop for entropy decoding for a binary set, and passes control to a function block 615. The function block 615 parses the tree index syntax, gets the tree used by the encoder, and passes control to a function block 620. The function block 620 decodes the binary set using the decoded tree, and passes control to a loop limit block 625. The loop limit block 625 ends the loop, and passes control to an end block 699.

Figure 7:
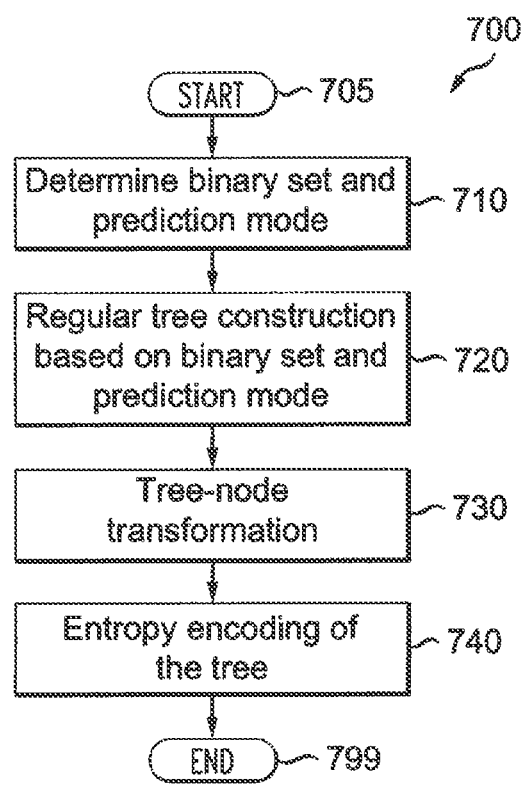
FIG. 7 is a flow diagram showing an exemplary method for encoding with tree-node transformation, in accordance with an embodiment of the present principles.

Turning to FIG. 7, an exemplary method for encoding with tree node transformation is indicated generally by the reference numeral 700. The method 700 includes a start block 705 that passes control to a function block 710. The function block 710 determines a binary set and prediction mode, and passes control to a function block 720. The function block 720 performs a regular tree construction based on the binary set and the prediction mode (determined by function block 710), and passes control to a function block 730. The function block 730 performs a tree node transformation, and passes control to a function block 740. The function block 740 performs entropy encoding of the tree, and passes control to a function block 799.

Figure 8:
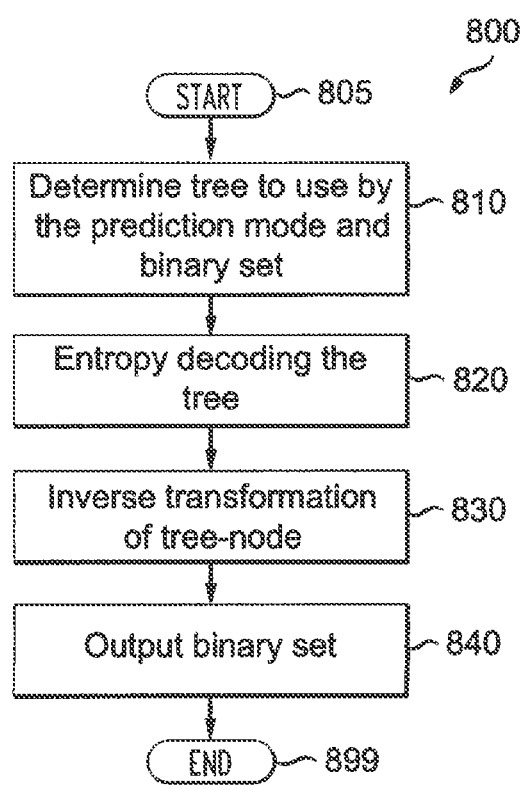
FIG. 8 is a flow diagram showing an exemplary method for decoding with tree-node transformation, in accordance with an embodiment of the present principles.

Turning to FIG. 8, an exemplary method for decoding with tree node transformation is indicated generally by the reference numeral 800. The method 800 includes a start block 805 that passes control to a function block 810. The function block 810 determines a (particular) tree to use by the prediction mode and the binary set, and passes control to a function block 820. The function block 820 entropy decodes the tree, and passes control to a function block 830. The function block 830 performs an inverse transformation of a tree node(s), and passes control to a function block 840. The function block 840 outputs a binary set (based on a result of the inverse transformation), and passes control to an end block 899.

Figure 9:
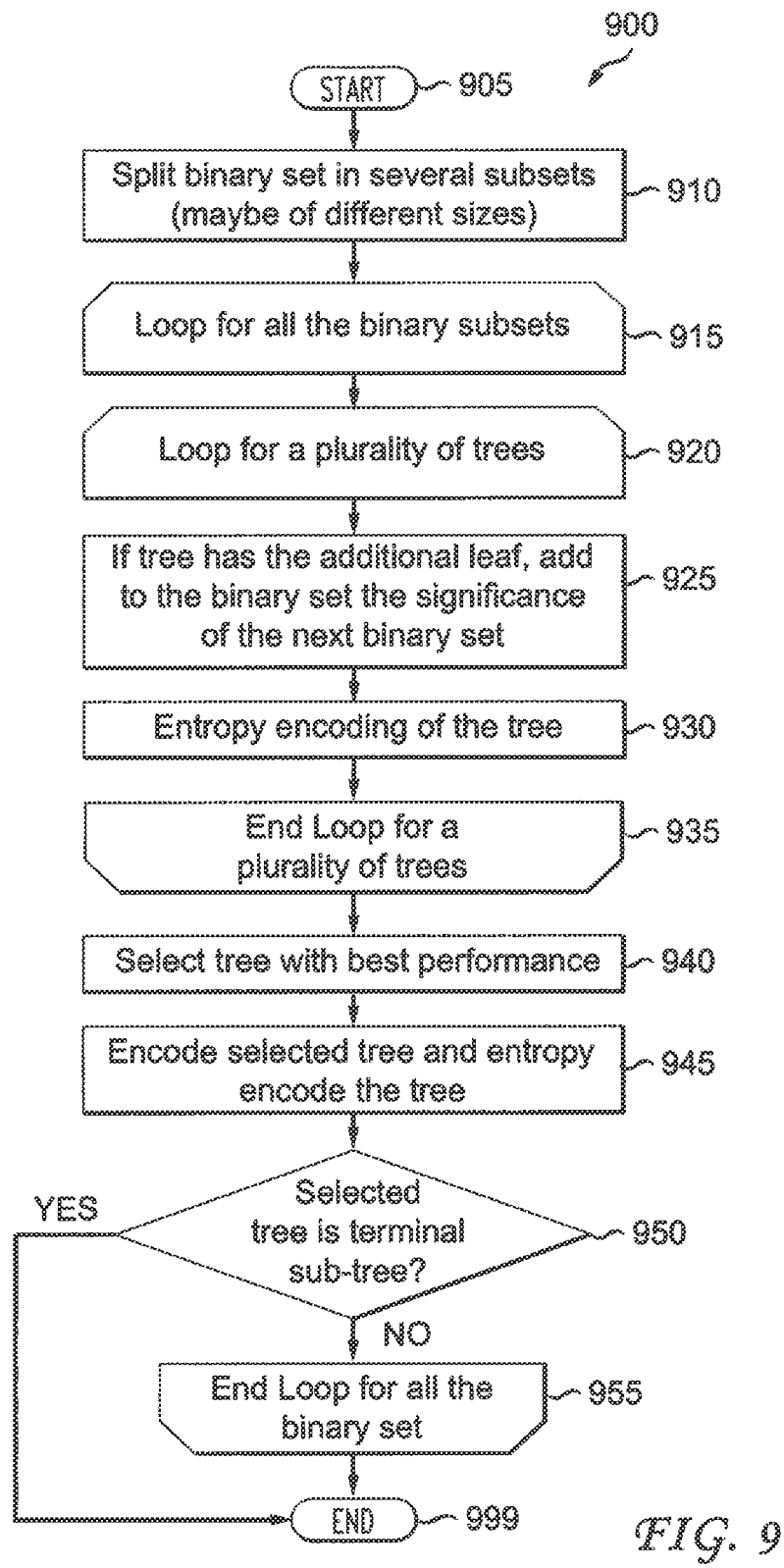
FIG. 9 is a flow diagram showing another exemplary method for encoding with tree-node transformation, in accordance with an embodiment of the present principles.

Turning to FIG. 9, another exemplary method for encoding with tree node transformation is indicated generally by the reference numeral 900. The method 900 includes a start block 905 that passes control to a function block 910. The function block 910 splits a binary set into several subsets (possibly of different sizes), and passes control to a loop limit block 915. The loop limit block 915 begins a loop for all the binary subsets, and passes control to a loop limit block 920. The loop limit block 920 beings a loop for a plurality of trees, and passes control to a function block 925. The function block 925 adds the significance of the next binary subset to the current subset, and passes control to a function block 930. The function block 930 entropy codes the tree, and passes control to a loop limit block 935. The loop limit block 935 ends the loop for the plurality of trees, and passes control to a function block 940. The function block 940 selects the tree with the best performance, and passes control to a function block 945. The function block 945 entropy encodes the selected tree, and passes control to a decision block 950. The decision block 950 determines whether or not the selected tree is a terminal sub-tree. If so, then control is passed to an end block 999. Otherwise, control is passed to a loop limit block 955. The loop limit block 955 ends the loop for the binary sets, and passes control to the end block 999.

Figure 10:
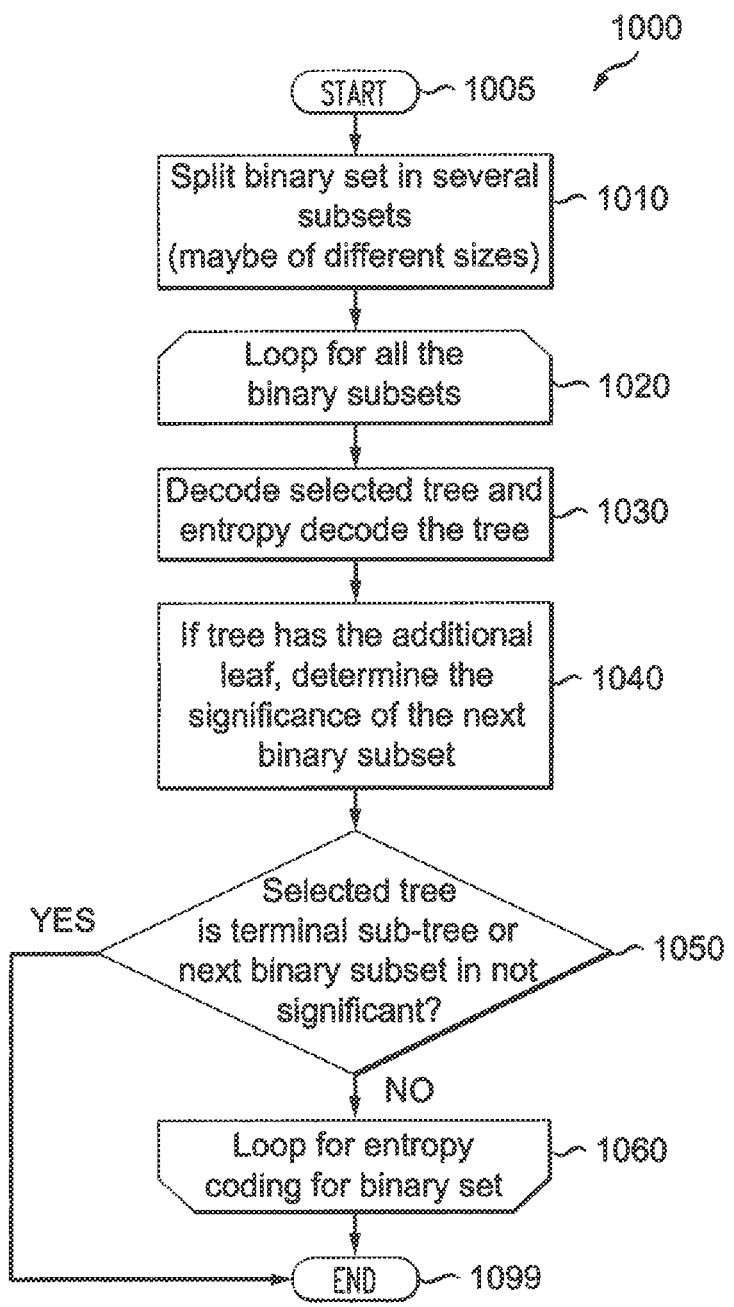
FIG. 10 is a flow diagram showing another exemplary method for decoding with tree-node transformation, in accordance with an embodiment of the present principles.

Turning to FIG. 10, another exemplary method for decoding with tree node transformation is indicated generally by the reference numeral 1000. The method 1000 includes a start block 1005 that passes control to a function block 1010. The function block 1010 splits a binary set into several subsets (possibly of different sizes), and passes control to a loop limit block 1020. The loop limit block 1020 begins a loop for all the binary subsets, and passes control to a function block 1030. The function block 1030 decodes the selected tree and entropy decodes the tree, and passes control to a function block 1040. The function block 1040 determines the significance of the next binary subset of the current tree has an additional leaf, and passes control to a decision block 1050. The decision block 1050 determines whether or not the selected tree is a terminal sub-tree or whether or not the next binary subset is not significant. If so, then control is passed to an end block 1099. Otherwise, control is passed to a loop limit block 1060. The loop limit block 1060 ends the loop for all the binary subsets, and passes control to the end block 1099.

A description will now be given of some of the many attendant advantages/features of the present invention, some of which have been mentioned above. For example, one advantage/feature is an apparatus having a video encoder for encoding picture data for at least a block in a picture. The video encoder selects from among a plurality of trees to code a binary set of data for indicating coefficient significance for at least the block.

Another advantage/feature is the apparatus having the video encoder as described above, wherein the video encoder selects one or more trees from among the plurality of trees.

Yet another advantage/feature is the apparatus having the video encoder wherein the video encoder selects one or more trees from among the plurality of trees as described above, wherein the one or more trees are selected based on one or more metrics, the one or more metrics comprising at least one of a bit rate and a rate distortion.

Still another advantage/feature is the apparatus having the video encoder wherein the video encoder selects one or more trees from among the plurality of trees as described above, wherein the selected one or more trees are indicated as side information.

A further advantage/feature is the apparatus having the video encoder as described above, wherein the video encoder selects from among the plurality of trees according to at least one of a prediction mode, a transform, decoded data for one or more previously decoded blocks, and other decoded data for the block.

A still further advantage/feature is the apparatus having the video encoder as described above, wherein the binary set of data is coded by dividing the binary set of data into a plurality of subsets and coding the plurality of subsets, and the video encoder selects from among the plurality of trees and the plurality of subsets to code the plurality of subsets.

Moreover, another advantage/feature is the apparatus having the video encoder wherein the binary set of data is coded by dividing the binary set of data into a plurality of subsets and coding the plurality of subsets, and the video encoder selects from among the plurality of trees and the plurality of subsets to code the plurality of subsets as described above, wherein at least one of the plurality of sub-trees has an additional node to indicate a zero value or a non-zero value of remaining lower nodes in the at least one of the plurality of sub-trees.

Further, another advantage/feature is the apparatus having the video encoder wherein the binary set of data is coded by dividing the binary set of data into a plurality of subsets and coding the plurality of subsets, and the video encoder selects from among the plurality of trees and the plurality of subsets to code the plurality of subsets as described above, wherein at least one of the plurality of sub-trees is a terminal sub-tree such that a selection of the terminal sub-tree indicates that all remaining portions of the binary set of data are equal to zero.

Also, another advantage/feature is the apparatus having the video encoder wherein the binary set of data is coded by dividing the binary set of data into a plurality of subsets and coding the plurality of subsets, and the video encoder selects from among the plurality of trees and the plurality of subsets to code the plurality of subsets as described above, wherein each of the plurality of trees comprises a plurality of nodes, and at least some of the plurality of trees have different sizes corresponding to different numbers of nodes comprised therein.

Additionally, another advantage/feature is an apparatus having a video encoder for encoding picture data for at least a block in a picture, wherein one or more trees are used to encode a binary set of data for indicating coefficient significance for at least the block, the one or more trees each having a plurality of nodes, at least one of the nodes of at least one of the one or more trees being modified responsive to one or more parameters.

Moreover, another advantage/feature is the apparatus having the video encoder as described above, wherein the plurality of nodes, for each of the one or more trees, includes a root node and at least one leaf node, and a binary transform is applied to at least one of the at least one leaf node.

Further, another advantage/feature is the apparatus having the video encoder wherein the plurality of nodes, for each of the one or more trees, includes a root node and at least one leaf node, and a binary transform is applied to at least one of the at least one leaf node as described above, wherein the binary transform is a binary wavelet transform or a binary Fourier transform.

Also, another advantage/feature is the apparatus having the video encoder as described above, wherein a subtraction is applied to the at least one of the nodes to modify the at least one of the nodes.

Additionally another advantage/feature is the apparatus having the video encoder as described above, wherein the plurality of nodes, for each of the one or more trees, includes a root node and two or more consecutive leaf nodes, the at least one of the nodes being modified comprising the two or more consecutive leaf nodes, and an exclusive OR operation is applied to at least two of the two or more consecutive leaf nodes to modify the at least of the two or more consecutive leaf nodes.

Moreover, another advantage/feature is the apparatus having the video encoder as described above, wherein a bit in the at least one of the nodes is flipped in value to modify the at least one of the nodes.

Further, another advantage/feature is the apparatus having the video encoder as described above, wherein the at least one of the nodes being modified represents only a portion of a total number of nodes in the one or more trees being modified such that only the portion of the total number of nodes is modified.

Also, another advantage/feature is the apparatus having the video encoder wherein the at least one of the nodes being modified represents only a portion of a total number of nodes in the one or more trees being modified such that only the portion of the total number of nodes is modified as described above, wherein more than one of the one or more trees are modified responsive to the one or more parameters, and a particular node from which a modification begins varies between at least two trees from among the more than one of the one or more trees.

Additionally, another advantage/feature is the apparatus having the video encoder as described above, wherein more than one of the one or more trees is modified responsive to the one or more parameters, each tree including a set of nodes, and different modifications are applied to different node subsets between at least two trees from among the more than one of the one or more trees.

Moreover, another advantage/feature is the apparatus having the video encoder wherein more than one of the one or more trees is modified responsive to the one or more parameters, each tree including a set of nodes, and different modifications are applied to different node subsets between at least two trees from among the more than one of the one or more trees as described above, wherein the different node subsets subject to the different modifications are adaptively determined.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. An apparatus, comprising:
   a video encoder for encoding picture data for a block in a picture, wherein one or more tree structures are used to encode a binary set of data for indicating coefficient significance for the block, the one or more tree structures, comprising one or more sub-trees, each having a plurality of nodes, wherein, a set of sub-trees is used to encode a particular part of a significance map, said significance map indicating coefficient significance for the block, wherein each sub-tree is a data structure used to convey a particular significance map for a set of scanned coefficients, the coefficient significance is mapped to nodes of the tree structures, linked to neighboring coefficients from two dimensions, and wherein some nodes of the tree structures are processed to encode non-zeros, while other nodes of the tree structures are processed to encode zeros, and a flag indicates at least one significant coefficient in said block corresponding to the significance map.

2. In a video encoder, a method, comprising:
   encoding picture data for a block in a picture, wherein one or more tree structures are used to encode a binary set of data for indicating coefficient significance for the block, the one or more tree structures each, comprising one or more sub-trees, each having a plurality of nodes, wherein, a set of sub-trees is used to encode a particular part of a significance map, said significance map indicating coefficient significance for the block, wherein each sub-tree is a data structure used to convey a particular significance map for a set of scanned coefficients, the coefficient significance is mapped to nodes of the tree structures, linked to neighboring coefficients from two dimensions, and wherein some nodes of the tree structures are processed to encode non-zeros, while other nodes of the tree structures are processed to encode zeros, and a flag indicates at least one significant coefficient in said block corresponding to the significance map having a plurality of nodes, at least one of the nodes of the at least one of the one or more tree structures being modified responsive to one or more parameters.

3. The method of claim 2, wherein the plurality of nodes, for each of the one or more tree structures, comprises a root node and at least one leaf node, and a binary transform is applied to at least one of the at least one leaf node.

4. The method of claim 3, wherein the binary transform is a binary wavelet transform or a binary Fourier transform.

5. The method of claim 2, wherein the at least one of the nodes being modified represents only a portion of a total number of nodes in the one or more tree structures being modified such that only the portion of the total number of nodes is modified.

6. An apparatus, comprising:
   a video decoder for decoding picture data for at least a block in a picture, wherein one or more tree structures are used to decode a binary set of data for indicating coefficient significance for the block, the one or more tree structures, comprising one or more sub-trees, each having a plurality of nodes, wherein, a set of sub-trees is used to decode a particular part of a significance map, said significance map indicating coefficient significance for the block, wherein each sub-tree is a data structure used to convey a particular significance map for a set of scanned coefficients, the coefficient significance is mapped to nodes of the tree structures, linked to neighboring coefficients from two dimensions, and wherein some nodes of the tree structures are processed to decode non-zeros, while other nodes of the tree structures are processed to decode zeros, and a flag indicates at least one significant coefficient in said block corresponding to the significance map.

7. In a video decoder, a method, comprising:
   decoding picture data for a block in a picture, wherein one or more tree structures are used to decode a binary set of data for indicating coefficient significance for the block, the one or more tree structures, comprising one or more sub-trees, each having a plurality of nodes, wherein, a set of sub-trees is used to encode a particular part of a significance map, said significance map indicating coefficient significance for the block, wherein each sub-tree is a data structure used to convey a particular significance map for a set of scanned coefficients, the coefficient significance is mapped to nodes of the tree structures, linked to neighboring coefficients from two dimensions, and wherein some nodes of the tree structures are processed to encode non-zeros, while other nodes of the tree structures are processed to encode zeros, and a flag indicates at least one significant coefficient in said block corresponding to the significance map.

8. The method of claim 7, wherein the plurality of nodes, for each of the one or more tree structures, comprises a root node and at least one leaf node, and a binary transform is applied to at least one of the at least one leaf node.

9. The method of claim 8, wherein the binary transform is a binary wavelet transform or a binary Fourier transform.

10. The method of claim 7, wherein the at least one of the nodes being modified represents only a portion of a total number of nodes in the one or more tree structures being modified such that only the portion of the total number of nodes is modified.

11. A non-transitory storage media having video signal data encoded thereupon, comprising:

a binary set of data for indicating coefficient significance for a block in a picture, wherein the binary set of data is encoded using one or more tree structures, the one or more tree structures, comprising one or more sub-trees, each having a plurality of nodes, wherein, a set of sub-trees is used to encode a particular part of a significance map, said significance map indicating coefficient significance for the block, wherein each sub-tree is a data structure used to convey a particular significance map for a set of scanned coefficients, the coefficient significance is mapped to nodes of the tree structures, linked to neighboring coefficients from two dimensions, and wherein some nodes of the tree structures are processed to encode non-zeros, while other nodes of the tree structures are processed to encode zeros, and a flag indicates at least one significant coefficient in said block corresponding to the significance map.

* * * * *